(12) United States Patent
Lee

(10) Patent No.: US 9,648,099 B2
(45) Date of Patent: May 9, 2017

(54) MOBILE APPARATUS, DISPLAY APPARATUS, METHOD FOR UI DISPLAY THEREOF AND COMPUTER-READABLE RECORDING MEDIUM

(71) Applicant: SAMSUNG ELECTRONICS CO., LTD., Suwon-si (KR)

(72) Inventor: Kang-rok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 179 days.

(21) Appl. No.: 14/041,130

(22) Filed: Sep. 30, 2013

(65) Prior Publication Data
US 2014/0229852 A1    Aug. 14, 2014

(30) Foreign Application Priority Data

Feb. 13, 2013  (KR) ........................ 10-2013-0015528

(51) Int. Cl.
*G06F 3/00*    (2006.01)
*H04L 29/08*   (2006.01)
*G06F 3/14*    (2006.01)
*G06F 3/03*    (2006.01)

(52) U.S. Cl.
CPC ............ *H04L 67/1095* (2013.01); *G06F 3/03* (2013.01); *G06F 3/14* (2013.01); *G06F 3/1423* (2013.01); *G06F 3/1438* (2013.01); *G09G 2340/02* (2013.01); *G09G 2340/0442* (2013.01); *G09G 2354/00* (2013.01); *G09G 2370/04* (2013.01); *G09G 2370/12* (2013.01)

(58) Field of Classification Search
CPC . G06F 3/14; G06F 3/03; G06F 3/1438; G06F 3/1423; G09G 2370/03; G09G 2370/04; G09G 2370/12; G09G 2340/02; G09G 2340/0442

See application file for complete search history.

(56) References Cited

U.S. PATENT DOCUMENTS

| 8,775,532 | B1* | 7/2014 | Kumar | G06Q 10/107 455/410 |
| 2008/0276164 | A1* | 11/2008 | Bamford | 715/238 |
| 2009/0265487 | A1* | 10/2009 | Zhang | G06Q 10/10 710/61 |
| 2010/0082784 | A1* | 4/2010 | Rosenblatt | H04L 12/2812 709/222 |
| 2012/0084711 | A1* | 4/2012 | Duarte | G06F 3/0481 715/783 |
| 2012/0203862 | A1* | 8/2012 | Tayeb et al. | 709/217 |
| 2014/0104137 | A1* | 4/2014 | Brown | G06F 3/1423 345/1.1 |
| 2014/0164989 | A1* | 6/2014 | Kuhne | 715/790 |

* cited by examiner

Primary Examiner — Mark A Radtke
Assistant Examiner — Parmanand Patel
(74) Attorney, Agent, or Firm — Sughrue Mion, PLLC

(57) ABSTRACT

A mobile apparatus communicatively connectable to a display apparatus includes a display screen configured to display a user interface comprising a plurality of user interface windows respectively corresponding to a plurality of applications running on the mobile apparatus. The mobile apparatus also includes a controller configured to control the user interface to display an indication that indicates supportability by the display apparatus of the plurality of applications running on the mobile apparatus in response to receiving a synchronizing request for synchronizing with the display apparatus.

22 Claims, 18 Drawing Sheets

FIG. 12
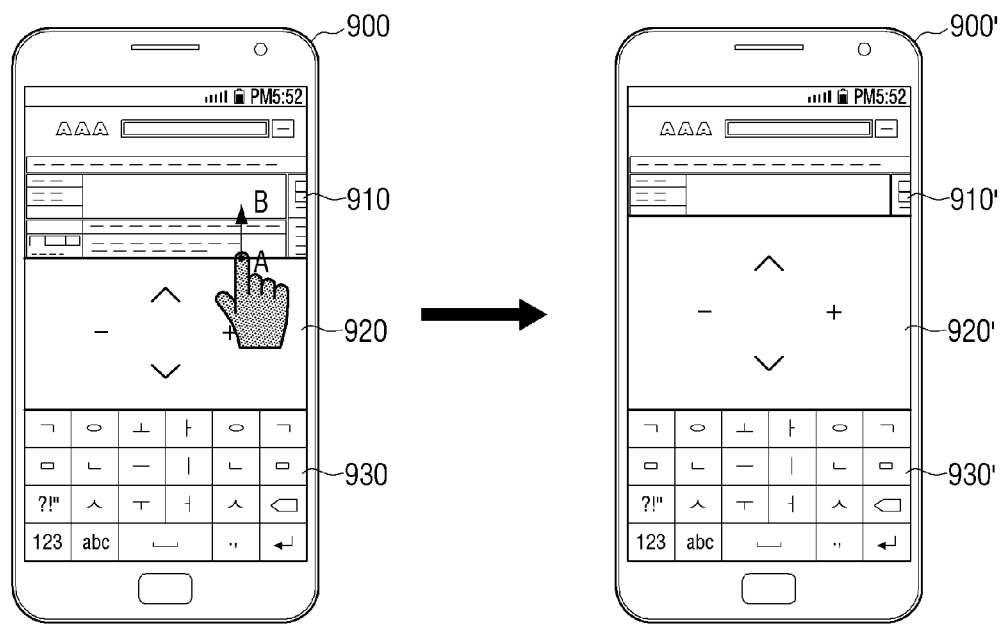
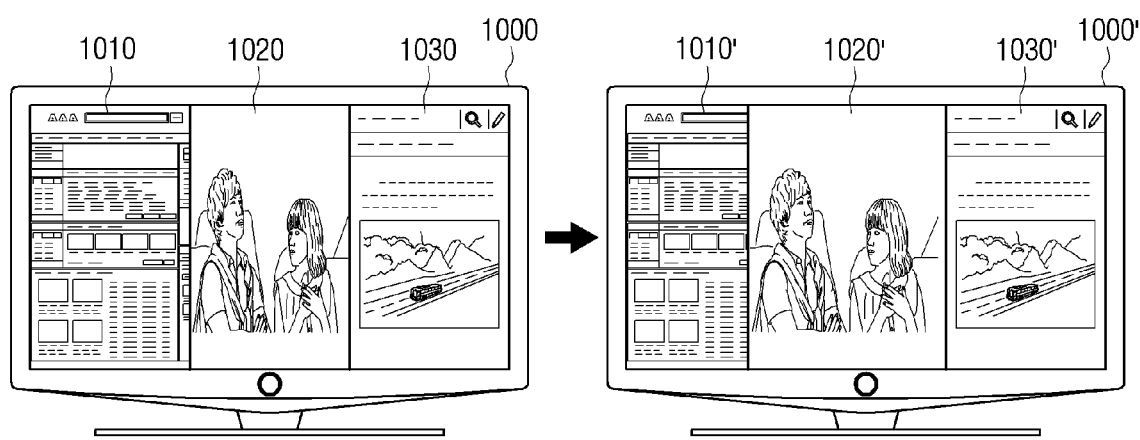

MOBILE APPARATUS, DISPLAY APPARATUS, METHOD FOR UI DISPLAY THEREOF AND COMPUTER-READABLE RECORDING MEDIUM

CROSS-REFERENCE TO RELATED APPLICATIONS

This application claims priority from Korean Patent Application No. 10-2013-0015528, filed in the Korean Intellectual Property Office on Feb. 13, 2013, the disclosure of which is incorporated herein by reference in its entirety.

BACKGROUND

1. Field

Devices, methods and media consistent with exemplary embodiments relate to a mobile apparatus, a display apparatus, a method for user interface (UI) display, and a computer-readable recording medium, and more specifically, to a mobile apparatus which can perform UI synchronization of a plurality of applications on the mobile apparatus and display apparatus, a method for displaying the synchronized UI, and a computer-readable recording medium.

2. Description of the Related Art

A display apparatus refers to an apparatus which displays image signals in an externally visible manner. As N-screen (or nScreen) technology has developed, a desired convergence of user functions has been applied to the different apparatuses. For example, sharing content, transmitting screens, sharing various kinds of information, and synchronizing has been implemented among the different devices.

However, application convergence has not actively been used, due to the inconveniences for a user caused by at least a complicated connection, lost connection, and the absence of continuity.

For example, there are methods for implementing, sharing, and displaying applications between 1:1, 1:N and N:N devices. A user may attempt an authorization and connection between devices, an implementation of applications on the devices, and then a sharing of content between the devices. Then communication that transmits data between applications can be performed by 1:1, 1:N and N:N devices.

However, devices having different hardware (H/W) specifications and operating system (OS) have differences in the currently viewed screen on which a plurality of convergence applications may desirably be implemented. Accordingly, only one application can be communicated between a mobile device and a display device when a plurality of convergence applications are implemented, devices are connected, and the convergence function is used.

However, when communication is implemented among a plurality of applications that are converging, a multiple window structure may display on a mobile device that cannot be uniformly displayed on a display apparatus. Further, mobile devices may not implement a seamless UX environment. Further, it may be impossible to determine whether a display apparatus supports single or multi process environment.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide a mobile apparatus which performs UI synchronization regarding a plurality of applications between the mobile apparatus and a display apparatus, the display apparatus, a method for displaying UI and a computer readable recording medium thereof.

According to an aspect of an exemplary embodiment, there is provided a mobile apparatus communicatively connectable to a display apparatus, the mobile apparatus including a display screen configured to display a user interface that includes a plurality of user interface windows respectively corresponding to a plurality of applications, and a controller configured to control the user interface to display an indication that indicates supportability by the display apparatus of the plurality of applications running on the mobile apparatus in response to receiving a synchronizing request for synchronizing with the display apparatus.

The controller may control the display screen to display the indication that indicates whether the plurality of applications running on the mobile apparatus are supported by the display apparatus and whether the display apparatus can display the plurality of applications.

The display screen may display a first area that displays information relating to the display apparatus and a second area that displays information relating to the plurality of applications.

The second area may display the indication as icons indicating supportability by the display apparatus of the plurality of applications implemented in the mobile apparatus in response to the display apparatus indicating supportability of the plurality of applications, and display the indication as an icon regarding supportability of at least one application among the plurality of applications, when the display apparatus can only support driving a subset of the plurality of applications.

The second area displays icons only for applications from the plurality of applications that are supported by the display apparatus and which are being driven in the mobile apparatus.

The second area may arrange and display a plurality of icons in an arrangement similar to a format in which the applications will be displayed on the display apparatus when performing synchronization with the display apparatus.

The display screen may receive a marking position selected for the display apparatus regarding the plurality of applications, and the second area may arrange and display a plurality of icons so as to correspond to the selected marking position.

The synchronizing request may be inputted by at least one of a touching of a preset area of the screen, a gesture image detected by an image sensor, a pushing of a mechanical button integrated in a chassis of the mobile apparatus, a spatial movement detected by a piezoelectric sensor.

The mobile apparatus may additionally include an information collector which collects application information from the display apparatus on applications installed on the display apparatus in response to the synchronizing request being received. The controller may determine whether the display apparatus supports the plurality of applications based on the collected application information, and control the display screen to display the determined results.

The mobile apparatus may additionally include an information collector which collects information regarding supportability of the plurality of applications by the display apparatus in response to the synchronizing request being received. The controller may control the display screen to display the collected information regarding supportability.

The mobile apparatus may additionally include an information collector which searches a plurality of display apparatuses communicatively connectable to the mobile apparatus and collects from a plurality of display apparatuses information regarding applications installed in each of the plurality of discovered display apparatuses. The controller may determine supportability of the plurality of applications in each of the plurality of display apparatuses based on the collected application information from each of the plurality of collected display apparatuses, and controls the display screen to display the determined results.

The mobile apparatus may additionally include a position information generator which calculates marking position of applications in the display apparatus respectively corresponding to the plurality of applications in the mobile apparatus in response to a synchronizing command being received at the display apparatus, and a communicating interface which transmits marking position information regarding each of the plurality of applications to the display apparatus.

The position information generator may calculate marking position information of applications in the display apparatus in proportion to sizes of a plurality of user interface windows respectively corresponding to the plurality of applications.

When the mobile apparatus operates in a vertical display mode, the position information generator may calculate marking position information for applications in the display apparatus so as to correspond to position similar to the a plurality of user interface windows of the mobile apparatus while also rotating the marking position information such that the display apparatus operates in a corresponding horizontal display mode.

When a plurality of user interface windows are displayed vertically in a line, the position information generator may calculate marking position information so as to arrange applications of the display apparatus corresponding to the plurality of applications horizontally in a line.

The position information generator may calculate the marking position information by adjusting and scaling in accordance with resolution of the applications in the display apparatus.

The communicating interface may transmit information on the plurality of applications and position information of the plurality of applications to the display apparatus.

The communicating interface is further configured to transmit an install address at which a non-supportable application is installed in response to at least one of the plurality of applications not being installed in the display apparatus.

The position information may include resolution information regarding each of the plurality of applications.

The controller may display a bundle of user interface windows that respectively correspond to the plurality of applications, when a performing command is received.

According to an aspect of another exemplary embodiment, there is provided a display apparatus communicatively connectable to a mobile apparatus, the display apparatus including a communicating interface which receives, from the mobile apparatus, information regarding a plurality of applications and position information for the plurality of applications, a controller which drives a plurality of applications so as to correspond to the information regarding the plurality of applications, and a display screen which displays a user interface including a plurality of user interface windows corresponding to the plurality of applications so as to correspond to the received position information on a screen of the display apparatus.

According to an aspect of another exemplary embodiment, there is provided a user interface (UI) display method of a mobile apparatus communicatively connectable to a display apparatus, the UI display method including displaying, on a display screen of the mobile apparatus, a plurality of user interface windows respectively corresponding to a plurality of applications that are running on the mobile apparatus, receiving a request for synchronizing with the display apparatus, and displaying an indication that indicates supportability of the plurality of applications in the display apparatus.

The displaying supportability may include displaying on the display screen a first area which displays information relating to the display apparatus and a second area which displays information relating to the plurality of applications.

The UI display method may additionally include collecting application information from the display apparatus on applications which are installed on the display apparatus in response to the request for synchronizing being received, and determining whether the plurality of applications are supported in the display apparatus based on the collected application information.

According to an aspect of another exemplary embodiment, there is provided a non-transitory computer readable recording medium including a program which implements a UI display method, the UI display method may include displaying, on a display screen of a mobile apparatus, a plurality of user interface windows respectively corresponding to a plurality of applications that are running on the mobile apparatus, receiving a request for synchronizing with the display apparatus, and displaying an indication that indicates supportability of the plurality of applications in the display apparatus.

BRIEF DESCRIPTION OF THE DRAWINGS

The above and other aspects will be more apparent by describing certain exemplary embodiments with reference to the accompanying drawings, in which:

FIG. 12 illustrates changes in a user interface window of a display apparatus and a mobile apparatus in response to a command to adjust sizes regarding a bundle of user interface windows is inputted in accordance with an exemplary embodiment;

DETAILED DESCRIPTION OF EXEMPLARY EMBODIMENTS

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

Figure 1:
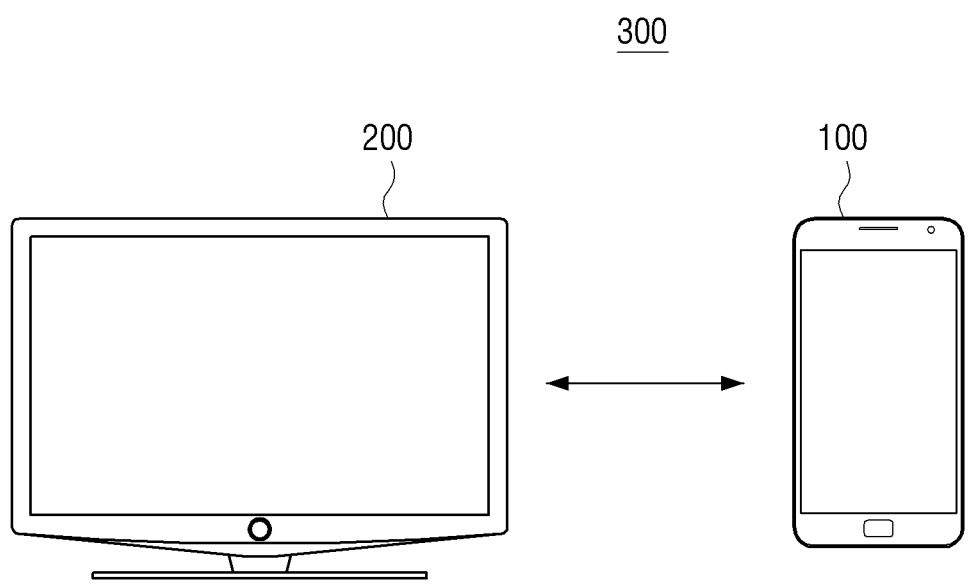
FIG. 1 is a schematic diagram of a network system in accordance with an exemplary embodiment.

FIG. 1 is a schematic diagram of a network system according to an exemplary embodiment.

Referring to FIG. 1, a network system 300 may include a mobile apparatus 100 and a display apparatus 200.

The mobile apparatus 100 may store a plurality of applications (hereinafter, 'mobile applications') and may perform multi-driving of the plurality of mobile applications. Specifically, the mobile apparatus 100 may receive, from a user, a command to drive the plurality of mobile applications, and then the mobile apparatus 100 may display user interface windows respectively corresponding to the mobile applications on one display screen. In this exemplary embodiment, the convergence application may perform synchronizing of the applications of the display apparatus 200.

When a request for synchronization with another device is provided by a user, the mobile device 100 may search for a display apparatus 200 in the vicinity, and display whether it is possible to synchronize the UI in the discovered display apparatus 200 with the user interface windows of the mobile applications which are currently displayed on the mobile apparatus 100. The mobile applications who are displaying user interface windows on the mobile apparatus 100 may also be referred to as the driving applications. Additionally, applications, which are implemented in the background without displaying a user interface window, are not referred to as the 'driving applications' in the description of one or more exemplary embodiments.

According to an exemplary embodiment, when a command to synchronize with a specific display apparatus 200 is provided by a user, the mobile apparatus 100 may perform UI synchronization by transmitting, to the selected display apparatus 200, information regarding applications to be synchronized and information regarding positions where corresponding applications are displayed. The mobile apparatus 100 may display a bundle of user interface windows respectively corresponding to currently driving mobile applications on one display screen. Specific composition and operation of a mobile apparatus 100 will be described below by referring to FIG. 2.

The display apparatus 200 may store a plurality of applications (hereinafter, 'display applications'), and may drive the display applications. For example, when application information is requested from the mobile apparatus 100, the display apparatus 200 may provide information regarding a plurality of display applications which are installed in the display apparatus 200 to the mobile apparatus 100.

When a command to synchronize is received from the mobile apparatus 100, the display apparatus 200 may drive the display applications that correspond to mobile applications, and display user interface windows corresponding to the display applications on one display screen based on position information, which may also be referred to as a layout or as layout information, included in the synchronizing command. Specific composition and operation of a display apparatus 200 will be described below by referring to FIG. 3.

According to an exemplary embodiment, the network system 300 may perform UI synchronization with nearby display apparatuses by simple button-inputting. Further, a user can perform UI synchronization more easily because the network system 300 may provide information regarding whether it is possible to perform multi-processing in the display apparatus or whether display applications corresponding to currently-driving mobile applications are installed in the display apparatus.

The above illustrates and describes that the mobile apparatus 100 connects directly to the display apparatus 200; however, according to an exemplary embodiment, the mobile apparatus 100 and the display apparatus 200 may connect through a mediating device such as a router. Further, although it is illustrated that the mobile apparatus 100 connects to one display apparatus 200, the mobile apparatus 100 may connect to a plurality of display apparatuses. Further, the display apparatus 200 may connect to a plurality of mobile apparatuses.

Figure 2:
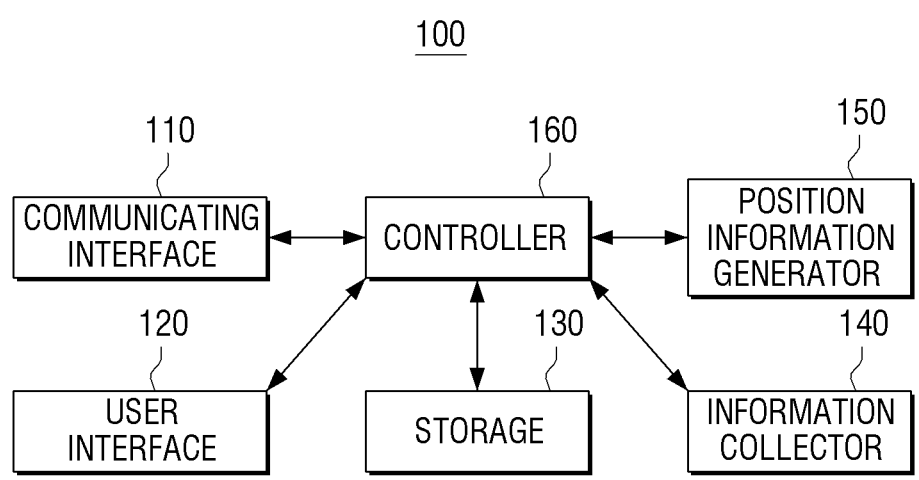
FIG. 2 is a detailed block diagram of the mobile apparatus in accordance with an exemplary embodiment.

FIG. 2 is a detailed block diagram of the mobile apparatus of FIG. 1.

Referring to FIG. 2, the mobile apparatus 100 according to an exemplary embodiment may include a communicating interface 110, a user interface 120, a storage 130, an information collector 140, a position information generator 150, and a controller 160. The mobile apparatus 100 described above may be a notebook, tablet, MPEG-1 or MPEG-2 Audio Layer III (commonly referred to as MP3) player, portable media player (PMP), and cellular phone which could be carried.

The mobile apparatus 100 may include a plurality of operating modes. The plurality of operating modes may include a horizontal mode in which a long axis of the display screen is placed horizontally so that user interface windows corresponding to applications can be displayed in response to a horizontal direction, and a vertical mode in which long axis of the display screen is placed vertically so that user interface windows corresponding to applications can be displayed in response to a vertical direction.

The communicating interface 110 is provided to connect the mobile apparatus 100 with an external device (not illustrated), and may connect to an external device through wireless communication methods, e.g., Bluetooth, Global System for Mobile Communications (GSM), Universal Mobile Telecommunications System (UMTS), long-term evolution (LTE), and wireless broadband (WiBro_, as well as local area network (LAN), and an Internet network.

The communicating interface 110 may perform communication with the display apparatus 200. Specifically, the communicating interface 110 may search display apparatuses within a near distance of the mobile apparatus 100 according to the control provided by the information collector 140 which will be described below. The communicating interface 110 may also receive application information from the discovered display apparatuses within a near distance.

Additionally, the communicating interface 110 may also receive device information from and about the corresponding display apparatus 200. The application information may be information regarding every application installed in the display apparatus 200 or information regarding whether there are display applications corresponding to mobile applications which are being driven in the mobile apparatus. Specific examples of application information will be described below by referring to FIG. 11.

The communicating interface 110 may transmit a synchronizing command to the display apparatus 200. Specifically, the communicating interface 110 may transmit information about applications to be synchronized and position information of the corresponding applications while transmitting a UI synchronizing command to the display apparatus 200 selected by a user. Meanwhile, although the above exemplary embodiment explains that transmitting a synchronizing command and transmitting information of applications and positions are separate operations, the above application information and position information may be included in the synchronizing command when being implemented.

When display applications corresponding to currently-driving mobile applications are not installed on the display apparatus 200, the communicating interface 110 may transmit an installation address from which the display applications that correspond to mobile applications can be installed from. Alternatively, information regarding the uninstall of the mobile application may be provided to the mobile apparatus.

The communicating interface 110 may transmit a user controlling command inputted through a user interface window displayed after synchronization with the display apparatus 200.

The user interface 120 may include a plurality of function keys where a user can establish or select various kinds of functions which are supported by the mobile apparatus 100. The user interface 120 may display various kinds of information provided by the mobile apparatus 100. The user interface 120 may be implemented by a device which allows for simultaneous inputting and outputting such as touch screen. Additionally, the user interface 120 may further include specific buttons.

The user interface 120 may receive a driving command regarding mobile applications from a user. When the mobile applications run in response to the driving command, the user interface 120 displays user interface windows corresponding to the mobile applications. In the event that a command to drive a plurality of mobile applications is inputted from a user, or if a command to drive another mobile application is additionally inputted while driving a first mobile application, the user interface 120 may display a plurality of user interface windows corresponding to a plurality of mobile applications on the one display screen. Exemplary embodiments of the user interface window will be described below by referring to FIG. 4.

The user interface 120 may receive a synchronizing request. Specifically, the user interface 120 may display icons to receive a synchronizing request from a user on a specific area of the display screen, and receive a synchronizing request from a user through the displayed icons. In accordance with other exemplary embodiments the request may be received by, a gesture image detected by an image sensor, a pushing of a mechanical button integrated in a chassis of the mobile apparatus, a spatial movement detected by a piezoelectric sensor. Meanwhile, although the embodiment illustrates and describes that a synchronizing request is inputted through the display screen, according to one or more exemplary embodiments, a synchronizing request may be inputted with another mechanical button disposed on the mobile apparatus or by other means such as inputs detected by camera sensors or piezoelectric sensors.

The user interface 120 displays the display apparatuses that can be connected. For example, in response to a synchronizing request by a user, the user interface 120 may display information for the display apparatuses 200 collected in the information collector 140 to be described below. At this step, the user interface 120 may also display whether the currently-driving mobile applications are supported in the discovered display apparatuses, for example, whether display applications corresponding to mobile applications are installed in the discovered display apparatuses. Further, the user interface 120 may display information regarding whether it is possible to drive a plurality of applications in the discovered display apparatuses. Exemplary embodiments of the user interface window will be described below by referring to FIGS. 5 through 7.

The user interface 120 may also display information regarding the display form of display applications in the display apparatuses. Specifically, the user interface 120 may display corresponding icons according to the display form of the display apparatuses when displaying icons regarding supportability of mobile applications. The user interface 120 may receive a selected marking position on the display apparatuses regarding a plurality of applications. When the marking position is selected, icons may be displayed in response to the selected marking position. Relevant explanation will follow by referring to FIG. 7.

The user interface 120 may receive a synchronizing command. Specifically, the user interface 120 may receive a synchronizing command regarding a corresponding display apparatus by receiving a selection of one of the discovered display apparatuses from a user. Meanwhile, although the embodiment describes that only one display apparatus is selected, the user interface 120 may receive a user selection of a plurality of display apparatuses when being implemented.

The user interface 120 may display a bundle of user interface windows corresponding to applications. Specifically, the user interface 120 may display the bundle of user interface windows regarding the currently-driving mobile applications. The bundle of user interface windows may be convergence UI windows, and revised user interface windows which are revised to be able to control driving of display applications. Exemplary embodiments of the user interface windows will be described below by referring to FIG. 9.

The user interface 120 may receive a command to adjust the size of the bundle of displayed user interface windows. Specifically, the user interface 120 may receive a user controlling command to adjust sizes regarding a plurality of bundles of user interface windows through a touch or slide input. When such a command to adjust sizes is received, the mobile apparatus 100 may respectively adjust sizes of display application windows which are displayed in the display apparatus corresponding to the adjusted user interface windows. An explanation of the one or more embodiments will follow with refer to FIG. 12.

The user interface 120 may receive a command to adjust sizes regarding the current bundle of user interface windows while displaying the bundle of user interface windows.

The storage 130 may store a program to drive the mobile apparatus 100. Specifically, the storage 130 may store a program which contains a plurality of different commands necessary for driving the mobile apparatus 100. The program may include a manage program to drive applications as well as mobile applications to provide specific services.

The storage 130 may be implemented as internal storing medium within the mobile apparatus 100 and external storing medium, e.g., removable disk including USB or web server through network.

The information collector 140 may collect information of applications which are installed in the display apparatus from the display apparatus. Specifically, when a synchronizing request is inputted from the user interface 120, the information collector 140 searches display apparatuses within a near distance by using the communicating interface 110. The information collector 140 may collect application information of corresponding display apparatus from each of the discovered display apparatuses. The application information may be information about every display application installed in the display apparatus or information of whether there are display applications corresponding to currently-driving mobile applications.

The information collector 140 may confirm whether the discovered display apparatuses can perform multi-driving. Although an exemplary embodiment describes that whether to perform multi driving is separately confirmed, the above application information may include information regarding whether to perform multi-driving.

The position information generator 150 calculates a marking position of a display application corresponding to a mobile application. Specifically, the position information generator 150 may calculate the marking position in the display apparatus 200 regarding a display application corresponding to a mobile application. The position information generator 150 may calculate the marking position of a user interface window regarding each of the display applications in the display apparatus in proportion to sizes of a plurality of user interface windows respectively corresponding to a plurality of mobile applications.

At this point in the process, the position information generator 150 may calculate the marking position by considering operating modes of the mobile apparatus 100. For example, when the mobile apparatus 100 operates in the vertical display mode, the position information generator 150 may calculate a marking position of a user interface window regarding each of display applications corresponding to positions of user interface windows to be displayed in the horizontal display mode. When the mobile apparatus 100 displays a plurality of user interface windows in a line on a vertical direction, the marking position information may be calculated so that user interface windows of the display applications corresponding to the plurality of mobile applications can be displayed in a line on a horizontal direction.

Further, the position information generator 150 may calculate a marking position of the display applications in response to position information of the display applications selected through the user interface 120.

Further, the position information generator 150 may calculate a marking position information based on resolution information of the display applications. Such operation will be described by referring to FIG. 16.

When a command to adjust size of the user interface window is inputted while performing synchronization, the position information generator 150 may recalculate a marking position of a user interface window regarding each of the display applications in the display apparatus in proportion to sizes of the plurality of user interface windows respectively corresponding to the plurality of adjusted mobile applications.

The controller 160 performs controlling regarding each unit within the mobile apparatus 100. For example, when a driving command regarding a mobile application is inputted from a user, the controller 160 drives the corresponding mobile application, and controls the user interface 120 to display a user interface window corresponding to the mobile application on the display screen. Meanwhile, when a user selects a plurality of applications, the user interface 120 may be controlled to display the user interface windows respectively corresponding to the plurality of selected applications on one display screen.

When a synchronizing request is received from a user in the above situation, the controller 160 may search display apparatuses within a near distance, and control the information collector 140 to determine whether UI synchronization with the currently-driving mobile applications is possible in the discovered display apparatuses.

The controller 160 may control the user interface 120 to display the display apparatuses discovered by the information collector 140 and whether UI synchronization can be performed in the discovered display apparatuses.

When a synchronizing command is received from a user, the controller 160 may control the communicating interface 110 to transmit the synchronizing command to a display apparatus to be synchronized. At this step, the synchronizing command may include information about the application to be synchronized and position information of the corresponding application.

Further, the controller 160 may control the user interface 120 to display the bundle of user interface windows regarding currently-driving mobile applications. When a user controlling command is received through the bundle of displayed user interface windows, the controller may transmit the inputted user controlling command to the selected display apparatus 200.

When a command to adjust sizes regarding the bundle of user interface windows which are currently displayed is received, the controller 160 may control the position information generator 150 to recalculate a marking position of a user interface window regarding each of the display applications in the display apparatus correspondingly to sizes of the adjusted user interface windows, and control the display apparatus to modify a display form of the display applications in the display apparatus according to the generated position information.

As describe above, the mobile apparatus 100 may perform UI synchronization with display apparatuses by button-inputting. The mobile apparatus 100 according to the exemplary embodiment may determine whether multi-processing can be performed in the display apparatus 200 and whether display applications corresponding to currently-driving mobile applications are installed in the display apparatus. Thus, a user can perform UI synchronization more readily given these determinations.

Figure 3:
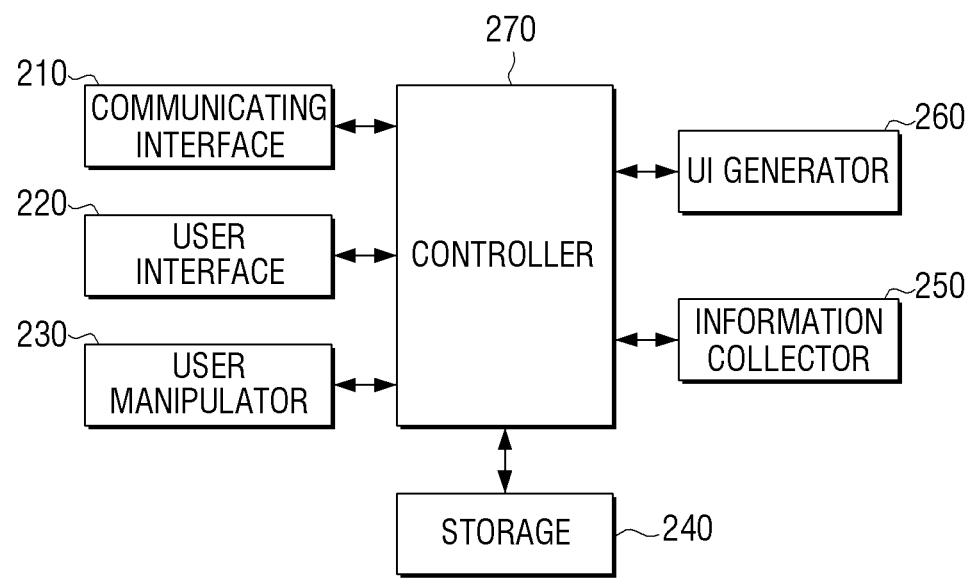
FIG. 3 is a detailed block diagram of the display apparatus in accordance with an exemplary embodiment.

FIG. 3, according to one or more exemplary embodiments, is a detailed block diagram of the display apparatus as illustrated in FIG. 1.

Referring to FIG. 3, the display apparatus 200 may include a communicating interface 210, a user interface 220, a user manipulator 230, a storage 240, an information collector 250, an UI generator 260, and a controller 270.

The communicating interface 210 is provided to connect the display apparatus 200 with an external device (not illustrated). Connection with an external device can be performed through wireless communication methods such as Bluetooth, GSM, UMTS, LTE, and WiBro as well as LAN or an Internet network.

The communicating interface 210 may perform communication with the mobile apparatus 100. Specifically, the communicating interface 210 may receive an application request from the mobile apparatus 100 and the communicating interface 210 may transmit a reply message in response to the request to the corresponding mobile apparatus 100. The reply message may be information regarding every display application installed in the display apparatus 200. In other words, the application requesting command may include information regarding specific application and the reply message may be information regarding whether the display application corresponding to the specific application is installed.

The communicating interface 210 may receive a synchronizing command from the mobile apparatus. At this point in the process, the communicating interface 210 may receive information regarding a plurality of applications and position information regarding corresponding applications respectively from the mobile apparatus.

The communicating interface 210 may receive a controlling command regarding the display applications. Specifically, the communicating interface 210 may receive a controlling command regarding the display applications from the mobile apparatus 100 after synchronizing.

The communicating interface 210 may receive image signals. Specifically, the communicating interface 210 may receive image signals from an external image providing devices such as set-top box. The image signals may be broadcasting signals which are delivered wirelessly from broadcasting stations or satellites or from a wired source, or the image signals may be image content which are delivered through High-Definition Multimedia Interface (HDMI) cables or audio-video (AV) components from a Digital Versatile Disc (DVD) player or a Blu-ray player, or image content which are delivered through Universal Serial Bus (USB) ports from a cellular phone or a computer.

The user interface 220 may display information provided from the display apparatus 200 itself. The user interface 220 may be implemented on a device which simultaneously implements inputting and outputting such as touch screen, or may be an image display device such as Liquid-crystal display (LCD), Plasma display panel (PDP), or Cathode ray tube (CRT).

The user interface 220 may display a plurality of user interface windows generated in the UI generator 260. Specifically, when a plurality of display applications are run in response to a synchronizing command from a mobile apparatus, the user interface 220 may display user interface windows regarding the plurality of display applications correspondingly to the received position information provided with the synchronizing command.

The user manipulator 230 may receive a user controlling command. Specifically, the user manipulator 230 may include a plurality of function keys, a capacitive touch sensor, an image sensor, or a piezoelectric sensor that a user can use to select various kinds of functions supported by the display apparatus 200. According to one or more exemplary embodiments, although the embodiment illustrates and describes that the user interface 220 and the user manipulator 230 are separate units, they may be implemented as one device, e.g., touch screen, where inputting and outputting are performed simultaneously.

Although the above exemplary embodiment describes that the display apparatus 200 directly receives a user controlling command, it may be received through a remote controller or the mobile apparatus described above.

The storage 240 may store content corresponding to various kinds of services supported by the display apparatus 200.

Further, the storage 240 may store a program to drive the display apparatus 200. Specifically, the storage 240 may store a program which includes different commands necessary for driving the display apparatus 200. The program may include a managing program to drive applications as well as applications to provide specific services.

The storage 240 may be implemented as an internal recording medium within the display apparatus 200, an external recording medium such as removable disk including USB memory, a storing medium connected to another host, and a web server accessible through a network.

The information collector 250 collects information regarding applications installed on the display apparatus 200. When a request for application information is received from a mobile apparatus, the information collector 250 may control the communicating interface 210 to transmit the collected application information to the mobile apparatus. Further, when a request by a mobile apparatus for application information is received which already includes specific application information for the mobile apparatus applications, the information collector 250 may determine whether a display application is installed and corresponds to the specific application information for the mobile apparatus application, and then control the communicating interface 210 to transmit the determined results as a reply message.

The UI generator 260 may generate user interface windows corresponding to display applications. The UI generator 260 may provide the generated user interface windows to the user interface 220.

Further, when a synchronizing command that corresponds to a plurality of mobile applications is received from a mobile apparatus, the UI generator 260 may generate user interface windows for each display application that respectively corresponds to each of the plurality of mobile applications and display the user interface windows on one display screen. Additionally, the UI generator 260 may not only generate one display screen of user interface windows regarding each of the display applications but may do so based on position information included in the synchronizing command. When display applications corresponding to the UI synchronizing command are not installed in the display apparatus 200; the UI generator 260 may display user interface windows that correspond to internet addresses that link to a location where the display applications can be installed from instead of user interface windows regarding the corresponding applications.

The controller 270 controls each unit within the display apparatus 200. Specifically, the controller 270 may control the information collector 250 and the communicating interface 210 to transmit reply message in response to corresponding request when a request for application information is received from a mobile apparatus.

When a synchronizing command is received from a mobile apparatus, the controller 270 may drive display applications corresponding to the synchronizing command, and control the UI generator 260 and the user interface 220 to create and display user interface windows respectively corresponding to the display applications as one display screen so as to correspond to the received position information as well.

When a controlling command is received from a mobile apparatus, operation of the display applications corresponding to the controlling command may be performed.

The display apparatus 200 according to an exemplary embodiment may perform UI synchronization in response to the synchronizing command from a mobile apparatus. Further, the display apparatus 200 may perform synchronization regarding a plurality of applications even when the mobile apparatus drives the plurality of applications.

FIGS. 4 to 9 are diagrams illustrating one or more exemplary embodiments of user interface windows that can be displayed in a mobile apparatus.

It can be appreciated that three mobile applications may be running in a mobile apparatus and the mobile apparatus may connect to three display apparatuses. Further, it can be appreciated that a first display apparatus 511-1 may perform multi-processing from among the three display apparatuses, and that three display applications corresponding to the three mobile applications may be installed in the first display apparatus 511-1. Further, a second display apparatus 511-2 may perform multi-processing and two display applications corresponding to two applications of the three mobile applications may be installed therein. Additionally, a third display apparatus 511-3 may not perform multi-processing, and therefore only one display application corresponding to one application of the three mobile applications may be installed therein.

Figure 4:
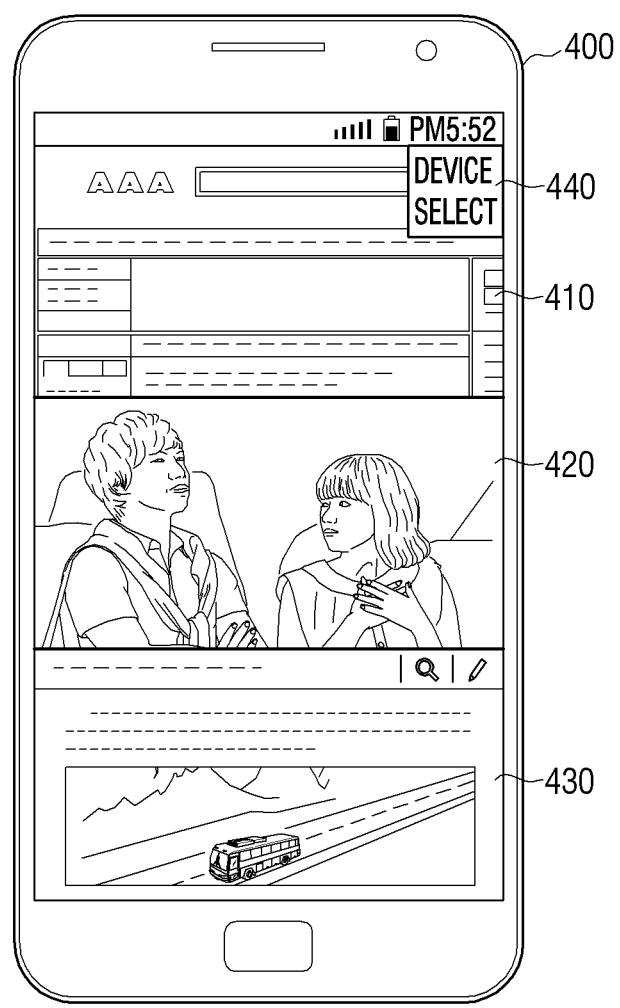
FIGS. 4 through 9 illustrate user interface windows that can be displayed on a mobile apparatus in accordance with one or more exemplary embodiments.

Referring to FIG. 4, and according to one or more exemplary embodiments, a mobile apparatus may drive three applications and simultaneously display user interface windows corresponding to the three applications. Specifically, display screen 400 may include a first user interface window 410, a second user interface window 420, a third user interface window 430, and a synchronizing request area 440.

The first user interface window 410 may be a user interface window corresponding to a first application, for example, an internet search application.

The second user interface window 420 may be a user interface window corresponding to a second application, for example, an internet video player application.

The third user interface window 430 may be a user interface window corresponding to a third application, for example, an application to receive a note memo.

The synchronizing request area 440 may be an area where a synchronizing request command can be received from a user, and the area may have an icon displayed in that area of the display screen 400. Further, the drawing describes that a synchronizing request command is received on certain area of the display screen; however, such a request command can be inputted through another mechanical button, selected through hidden icons, or received through an image or piezoelectric sensor.

Figure 5:
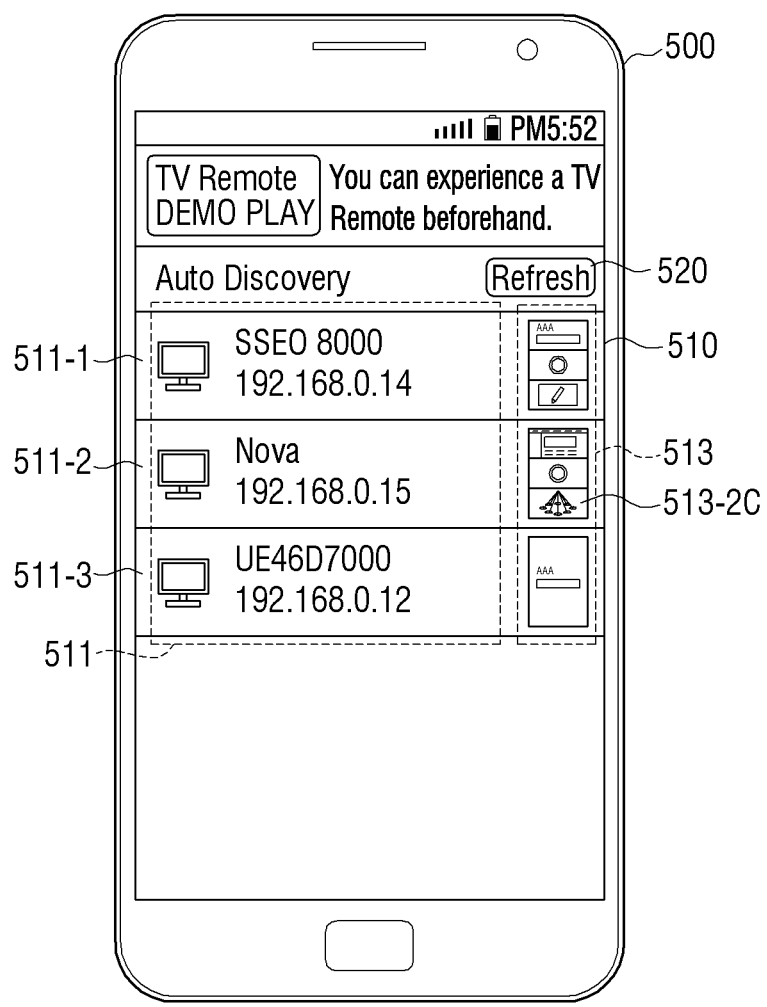
Figure 6:
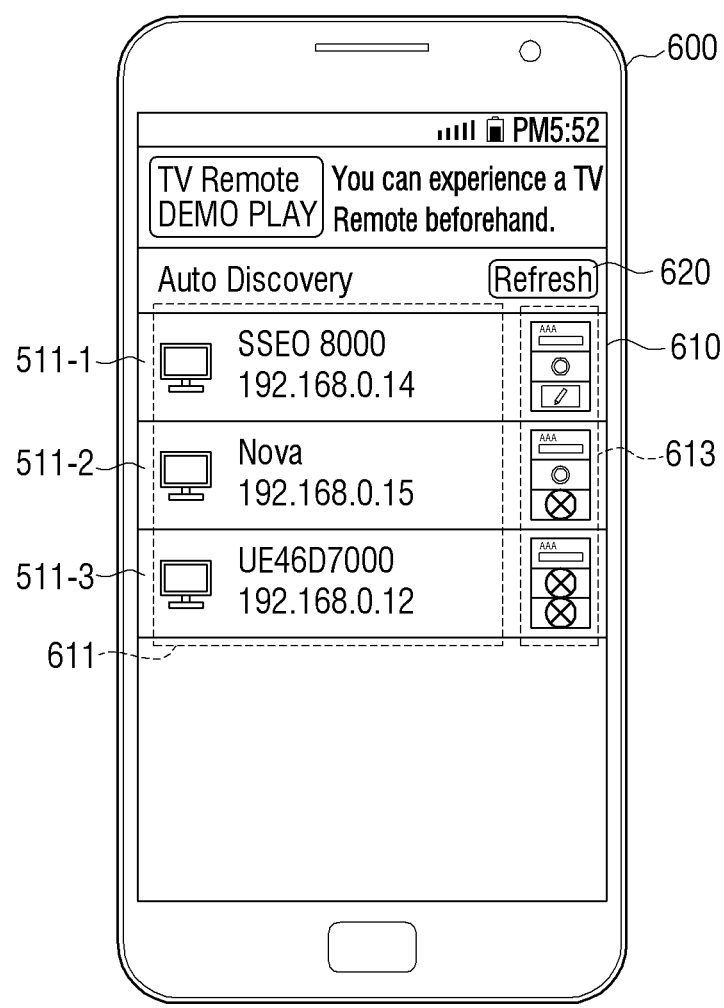
Figure 7:
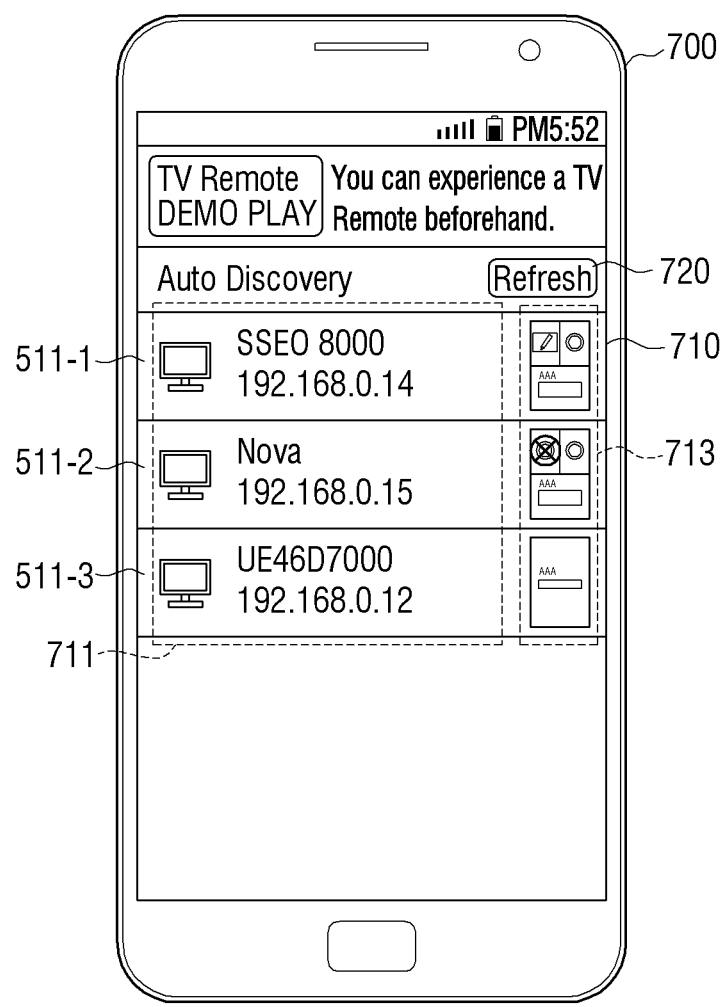

When a user selects the synchronizing request area 440 in the above display screen, the mobile apparatus 100 may display one screen among the illustrations shown in FIGS. 5 through 7.

For example, referring to FIG. 5, display screen 500 may include a search results display area 510 and a re-search area 520.

Further, the search results display area 510 may include a first area 511 and a second area 513.

The first area 511 may be an area that displays information corresponding to the discovered display apparatuses. Although the illustrated embodiment shows that names of the discovered apparatuses and IP address information are displayed, the device names or the IP address information may be displayed only, or other information may be additionally displayed.

The second area 513 may display information regarding supportable applications by the corresponding display apparatus. Specifically, when there are display applications that correspond to currently-driving mobile applications in the mobile apparatus, icons corresponding to the mobile applications may be displayed showing supportability. In an exemplary embodiment, the second area 513 may display a sample of the display layout that includes showing a small image that depicts the position and size attributes, as well as which user interface windows of the ones shown on the mobile device will be displayed on the display apparatus. The sample may also show the display apparatus's ability to only show a subset of user interface windows, as shown in FIG. 5, and may show the lack of supportability of one or more user interface windows, as shown in FIG. 6.

For example, the illustrated exemplary embodiment describes that icons corresponding to the three mobile applications are displayed because the first display apparatus 511-1 can perform multi-processing and the display applications corresponding to all of the three mobile applications are installed.

Further, because the second display apparatus 511-2 can perform multi-processing and display applications corresponding to two applications among the three applications are installed, icons corresponding to the two mobile applications are displayed. Further the displayed icon 513-2C indicates that it is necessary to install a display application which is not mounted.

Because the third display apparatus 511-3 cannot perform multi-processing, only the one icon corresponding to one mobile application that can be driven in the third display apparatus 511-3 is displayed.

The re-search area 520 is an area which receives a user command to re-search for display apparatuses communicatively connectable to a mobile apparatus. When this re-search area is selected, the mobile apparatus may re-search display apparatuses within a near distance, renew the results, and display them.

Through such user interface windows, a user can easily confirm whether each of the discovered display apparatuses supports multi-processing, and whether it is possible to UI synchronize with corresponding display apparatus for the currently-driving mobile display apparatus.

Further, although the above illustrates the displaying icons of the mobile applications that can be driven in the display apparatus on the second area, the second area may alternatively display whether to UI synchronize with each of currently-driving mobile applications as illustrated in FIG. 6 when being implemented.

Referring to FIG. 6, and according to one or more exemplary embodiments, display screen 600 may include a search results display area 610, a first display 611 are, and a re-search area 620. Because the other areas of FIG. 6, except a second area 613, are substantially similar to like elements in FIG. 5, the second area 613 will be described below.

The second area 613 displays icons regarding whether each of the display apparatus can UI synchronize with respective, currently-driving mobile applications in the mobile apparatus.

According to the illustrated exemplary embodiment, because the first display apparatus 511-1 can perform multi-processing and display applications corresponding to all of the three mobile applications that are also installed, icons corresponding to the three mobile applications are displayed.

Further, the second display apparatus 511-2 can perform multi-processing and display applications corresponding to two applications among the three mobile applications. Thus, icons corresponding to the two mobile applications are displayed, while an icon informing that it is impossible to UI synchronize regarding the other one mobile application is displayed.

Additionally, the third display apparatus 511-3 cannot perform multi-processing. Thus, an icon corresponding to one mobile application that can be driven in the third display apparatus 511-3 is displayed, and icons informing that it is impossible to UI synchronize regarding the other two mobile applications are displayed.

Further, the above illustrates that the mobile applications that can be driven in the display apparatus are displayed in a line in the second area. Alternatively, the second area may display icons corresponding to the mobile applications UI windows that may be displayed in the display apparatus.

Referring to FIG. 7, and in accordance with one or more exemplary embodiments, display screen 700 includes a search results display area 710 and a re-search area 720, as well as a first area 711. Because other areas of FIG. 7, except a second area 713, are substantially similar to like elements as shown in FIGS. 5 and 6, the second area 713 will be described below.

Specifically, the second area 713 may display information regarding supportable applications by the corresponding display apparatus. Specifically, the illustrated embodiment describes that the first display apparatus 511-1 may perform multi-processing, and that display applications corresponding to all of the three mobile applications are installed. Thus, icons corresponding to the three mobile applications are displayed. Further, the three icons may be arranged so as to correspond to display form of the three display applications.

When a user selects a portion of the second area 713, a display form of the display applications in the associated display apparatus may be adjusted. Specifically, operation adjusting display form in the display apparatus will be described by referring to FIG. 8.

The second display apparatus 511-2 may perform multi-processing and therefore may display applications corresponding to two applications among the three applications that are installed. Thus, icons corresponding to the two mobile applications are displayed, and an icon informing that it is impossible to UI synchronize the other one mobile application, is displayed. Further, the three icons may be arranged so as to correspond to display form of the three display applications.

The third display apparatus 511-3 may not perform multi-processing. Thu, an icon corresponding to one mobile application that can be driven in the third display apparatus 511-3 is displayed. Alternatively, an icon informing that it is impossible to UI synchronize the other two mobile applications may be displayed as well.

Figure 8:
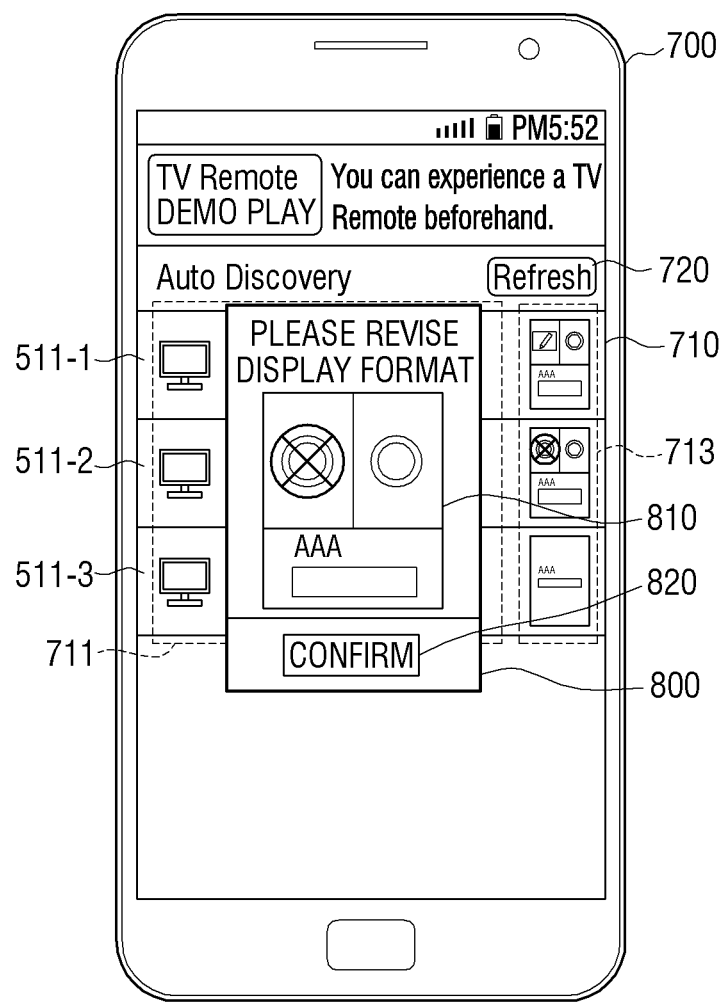

Referring to FIG. 8, and in accordance with one or more exemplary embodiments, a pop-up window 800 is displayed, including a plurality of icons displayed on the second area 713. On the displayed pop-up window 800, a user may adjust marking position of the display applications in the display apparatus by sliding or selecting icons within an area 810 where a plurality of icons are illustrated. When a user selects a confirm area 820 after moving the plurality of icons, the user interface 120 may display the user interface window 700 of FIG. 7, and the second area 713 on the user interface window 700 may display the icons as adjusted by the user such that they reflect the position selected by the user in the pop-up window 800.

Figure 9:
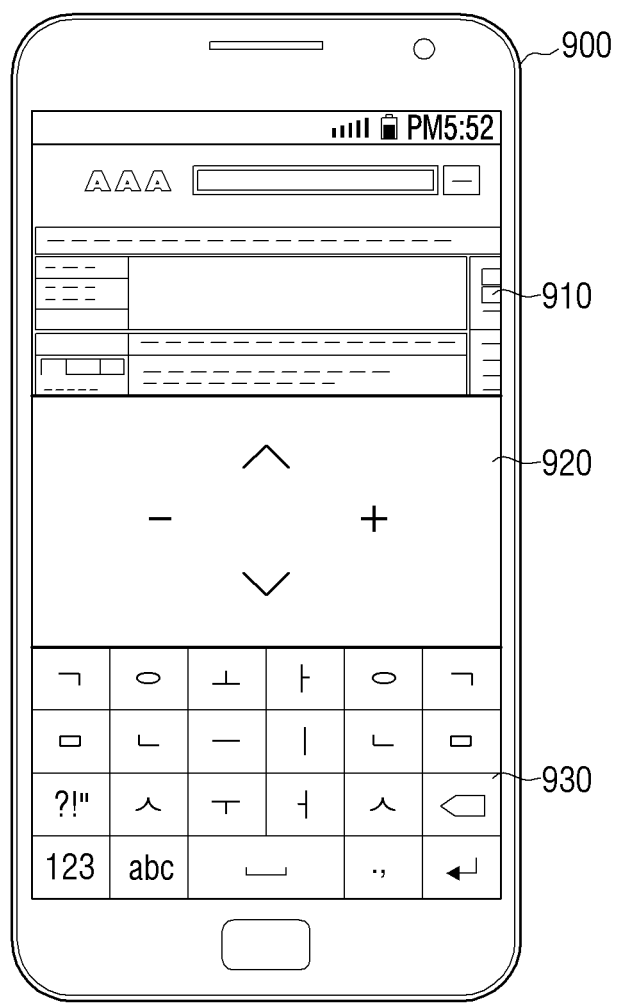
Figure 10:
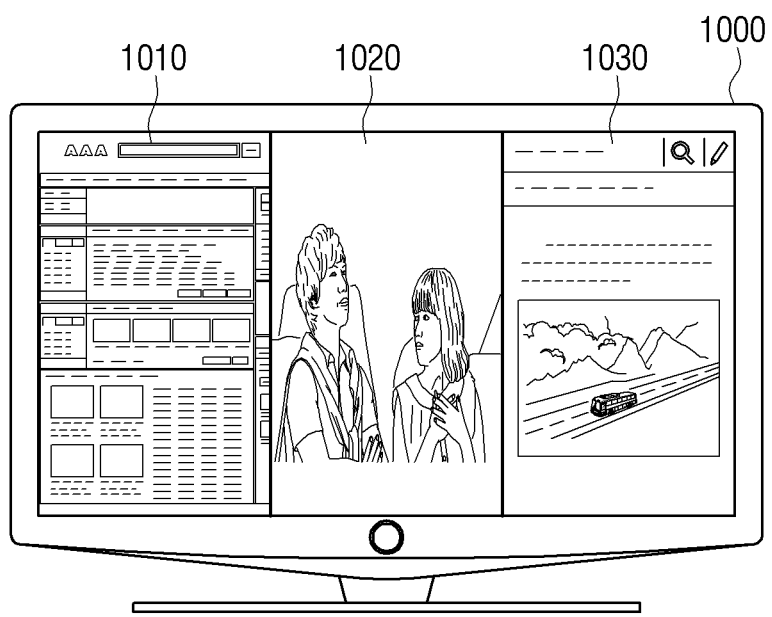
FIGS. 10 and 11 illustrate user interface windows that can be displayed on a display apparatus in accordance with one or more exemplary embodiments.
Figure 11:
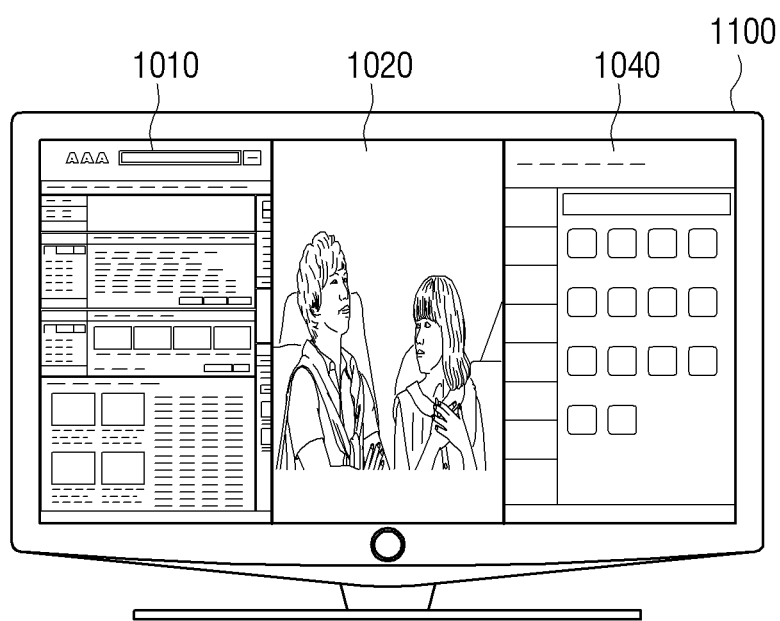

When a user selects one display apparatus, e.g., the display apparatus 511-1, on the user interface windows of FIGS. 5 to 7, the display screen as illustrated in FIG. 9 may be displayed. Further, the display apparatus may display the display screen as illustrated in FIG. 10. Meanwhile, when a user selects another display apparatus, e.g., the display apparatus 511-2, the display apparatus may display the display screen as illustrated in FIG. 11.

Referring to FIG. 9, and according to an exemplary embodiment, a mobile apparatus is performing UI synchronization with the selected display apparatus and a display screen 900 may include a bundle of user interface windows corresponding to the three applications which are being driven by the mobile apparatus.

Specifically, a first item 910 in the bundle of user interface windows is a user interface window corresponding to a first application, for example, an internet search application 910. Further, when applications do not support separate bundle of user interface windows, the mobile apparatus may display user interface windows which are the same as the conventional formats.

A second item 920 in the bundle of user interface windows is user interface window corresponding to a second application, for example, an internet video player application 920. Further, because video is displayed in the display apparatus by synchronizing with the second application, the second application may display a UI window to control video displayed in the display apparatus as a part of the bundle of user interface windows.

A third item 930 in the bundle of user interface windows is user interface window corresponding to a third application, for example, an application to receive note memo, or said another way is a character keypad application. Further, because note memo is displayed in the display apparatus by synchronizing with the third application, a UI board may be displayed to receive texts from a user as a part of the bundle of user interface windows.

FIGS. 10 to 11 are diagrams illustrating examples of user interface windows that can be displayed in a display apparatus similar to the one depicted in FIG. 1. Specifically, according to an exemplary embodiment, FIG. 10 is an example of a display screen of the corresponding first display apparatus when a user selects the first display apparatus as illustrated in FIG. 5. FIG. 11, according to an exemplary embodiment, is an example of a display screen of the corresponding second display apparatus when a user selects the second display apparatus as illustrated in FIG. 5.

Referring to FIG. 10, display screen 1000 displays a plurality of user interface windows 1010, 1020, 1030.

Particularly, a fourth user interface window 1010 may be a user interface window of a display application corresponding to a first application similar to the first application 410 or 910 described above with reference to FIGS. 4 and 9.

Further, a fifth user interface window 1020 may be a user interface window of a display application corresponding to a second application similar to the second application 420 or 920 described above with reference to FIGS. 4 and 9.

A sixth user interface window 1030 may be a user interface window of a display application corresponding to a third application similar to the third application 430 described above with reference to FIG. 4.

Compared with FIG. 4, the display screen 1000 of the display apparatus of FIG. 10 displays a plurality of user interface windows horizontally while the mobile apparatus of FIG. 4 displays a plurality of user interface windows vertically. Because the display apparatus usually displays long axis on a horizontal direction, the mobile apparatus calculates position information regarding a plurality of applications by considering these features so that a user can easily confirm user interface windows.

By referring to FIG. 11, display screen 1100 displays a plurality of user interface windows 1010, 1020, 1040.

Particularly, a fourth user interface window 1010 may be a user interface window of a display application corresponding to a first application similar to the first application 410 or 910 described above.

Further, a fifth user interface window 1020 may be a user interface window of a display application corresponding to a second application similar to the second application 420 or 920 described above.

A sixth user interface window 1040 may be a user interface window of another display application so as to install a display application corresponding to a third application similar to the third application 930 as described above in FIG. 9. Further, the second display apparatus may not install a display application corresponding to the third application. When a synchronizing command is inputted, the second display apparatus may drive an install application to install a display application corresponding to the third application and display user interface window corresponding to the installed application.

The above display operation may be performed by controlling a mobile apparatus or by mainly arranging the display apparatus. Specifically, the controlling of the mobile apparatus is provided for a transmitting of address information to install a display application corresponding to the mobile application instead of information regarding the application that is not installed in the display apparatus when transmitting information of the application to be synchronized.

Further, the arranging of the display apparatus may also include performing the installation of an application that should be installed given that it is the requested display application, assuming the display application corresponding to the requested synchronizing command is not already installed.

FIG. 12 is a diagram illustrating changes in user interface windows on the display apparatus and the mobile apparatus when a command to adjust sizes regarding a bundle of user interface windows is inputted.

Referring to FIG. 12, the display screen 900 is the same as in FIG. 9, which will not be further explained.

When a user inputs a command to reduce the first user interface window 910 which also constitutes a command to expand the second user interface window 920 on the display screen 900, the mobile apparatus may display the display screen 900' by modifying their sizes into the first user interface window 910' and the second user interface window 920'.

In response, the mobile apparatus recalculates marking position of the fourth user interface window 1010 and the fifth user interface window 1020 in the display apparatus corresponding to the adjusted first user interface window 910 and the adjusted second user interface window 920, and transmits the recalculated marking position to the display apparatus.

Therefore, the display apparatus may have a display screen 1000' on which sizes of the fourth user interface window 1010' and the fifth user interface window 1020' are adjusted.

Figure 13:
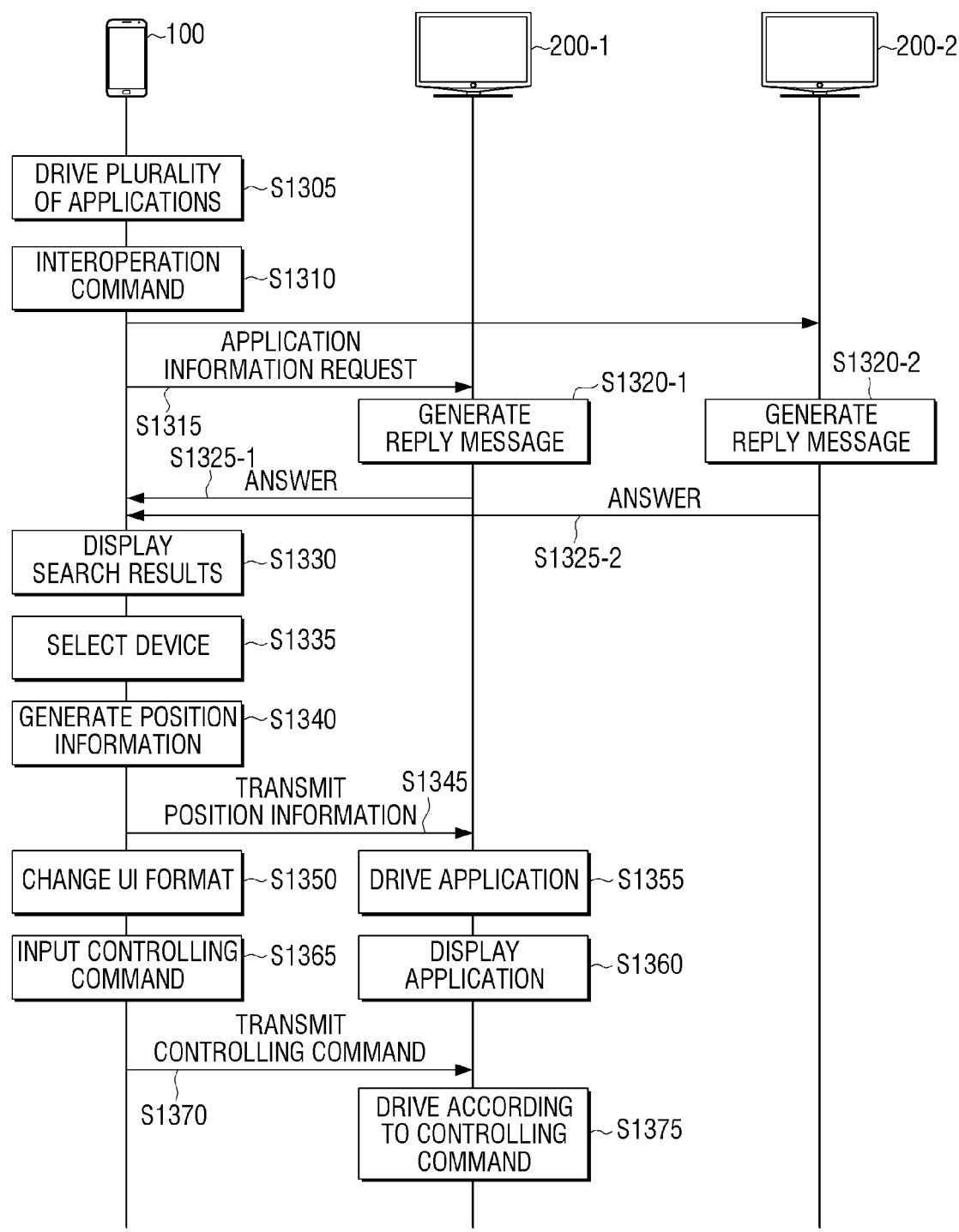
FIG. 13 is a sequential diagram illustrating operation of a network system in accordance with an exemplary embodiment.

FIG. 13 is a sequential diagram illustrating operation of the network system according to an exemplary embodiment.

Referring to FIG. 13, the mobile apparatus 100 receives a driving command regarding a plurality of mobile applications from a user and drives the plurality of applications in which the driving command is inputted at S1305.

While the plurality of applications are being driven, when a UI synchronizing command or an interoperation command, is received from a user at S1310, the mobile apparatus 100 searches communicatively connectable display apparatuses within a set distance and requests application information from the discovered display apparatuses 200-1, 200-2 at S1315. At this step, the requesting may request information regarding all of the display applications installed in corresponding display apparatuses and information regarding availability of multi-processing. Alternatively, the requesting may request information regarding whether installing display applications corresponding to the currently-driving mobile applications is possible or information regarding availability of multi-processing.

Each of the display apparatuses 200-1, 200-2 which receives the request generates a reply message in response to the request at S1320-1, S1320-2, and transmits the generated reply message to the mobile apparatus 100 at S1325-1, S1325-2.

The mobile apparatus 100 receiving the reply message displays the discovered display apparatuses and whether it is possible to perform UI synchronization in each of the discovered display apparatuses at S1330. For example, one of the screens of FIGS. 5 to 7 may be displayed.

When the display apparatus 200-1 to perform synchronization is selected by a user at S1335, the mobile apparatus 100 generates position information by calculating marking position information regarding the plurality of display applications corresponding to the plurality of applications in the display apparatus 200-1 at S1340, and transmits the generated position information while transmitting a synchronizing command to the selected display apparatus 200-1 at S1345.

When a synchronizing command is inputted, the mobile apparatus 100 displays the bundle of user interface windows respectively corresponding to the plurality of currently-driving applications at S1350, the first display apparatus 200-1 drives the plurality of display applications S1355 corresponding to the synchronizing command, and displays the plurality of user interface windows corresponding to the plurality of display applications according to the received position information on one display screen at S1360.

After synchronizing, when a controlling command regarding specific application is inputted from a user through the mobile apparatus 100 at S1365, the selected controlling command is transmitted to the first display apparatus 200-1 at S1370.

The first display apparatus 200-1 receiving the controlling command performs driving corresponding to the received controlling command at S1375. For example, when texts are inputted through the bundle of user interface windows corresponding to the third application, the mobile apparatus 100 may transmit the received texts to the first display apparatus and the first display apparatus 200-1 may display the received texts on the display application corresponding to the third application.

Figure 14:
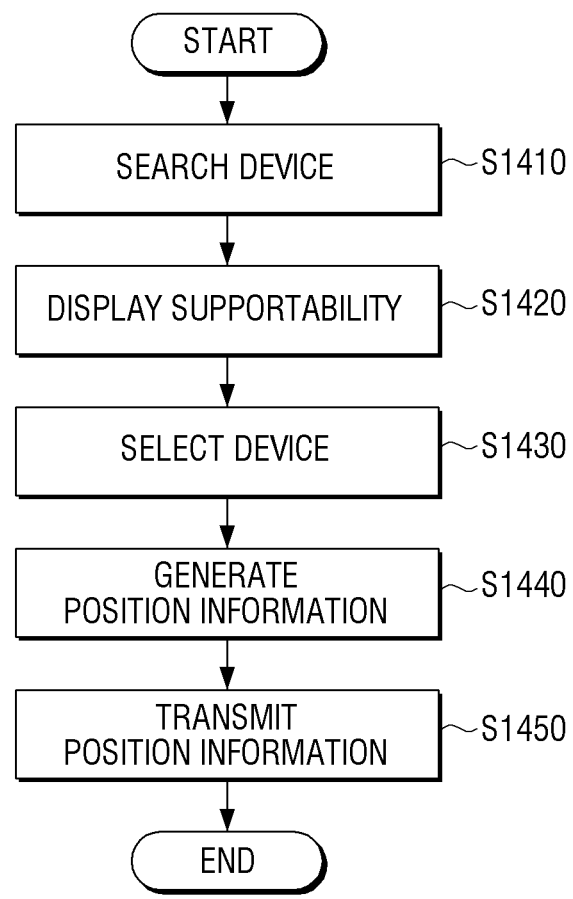
FIG. 14 is a flowchart provided to explain a method for displaying a UI in a mobile apparatus in accordance with an exemplary embodiment.

FIG. 14 is a flowchart provided to explain a method for displaying UI in the mobile apparatus according to an embodiment.

Referring to FIG. 14, and according to one or more exemplary embodiments, communicatively connectable display apparatuses are discovered at S1410 when a synchronizing command regarding the plurality of applications is received while displaying the plurality of user interface windows respectively corresponding to the plurality of applications on one display screen, while performing multi-processing.

At S1420, an indication that indicates supportability of the discovered display apparatuses regarding the plurality of applications is displayed. Specifically, the display may include: the first area which displays information about the display apparatuses and the second area which displays information regarding applications supported by the display apparatuses.

When a synchronizing command for the discovered display apparatuses is generated and further in response to a selection inputted from a user of a discovered display apparatus at S1430, position information is generated by calculating marking position regarding the plurality of applications on the selected corresponding display apparatus at S1440.

At S1450, synchronization with the selected display apparatus is performed by transmitting the generated position information.

The method for displaying a UI according to an exemplary embodiment may perform UI synchronization with near display apparatuses by simply button-inputting. Further, the method for displaying a UI according to an exemplary embodiment provides information regarding whether multi-processing can be performed in the display apparatus 200 and whether the display applications corresponding to the currently-driving mobile applications are installed in the display apparatus. Thus, a user can perform UI synchronization more expeditiously. The UI display method of FIG. 14 may be implemented in the mobile apparatus including element composition as illustrated of FIG. 2, or other mobile apparatuses including different compositions.

Further, the above UI display method may be implemented with a program (or an application) including algorithms that can run in a computer, and the program may be stored and provided in non-transitory computer readable medium.

Non-transitory computer readable medium indicate medium which store data semi-permanently and can be read by devices, not medium storing data temporarily such as register, cache, or memory. Specifically, the above various applications or programs may be stored and provided in non-transitory computer readable medium such as CD, DVD, hard disk, Blu-ray disk, USB, memory card, or ROM.

Figure 15:
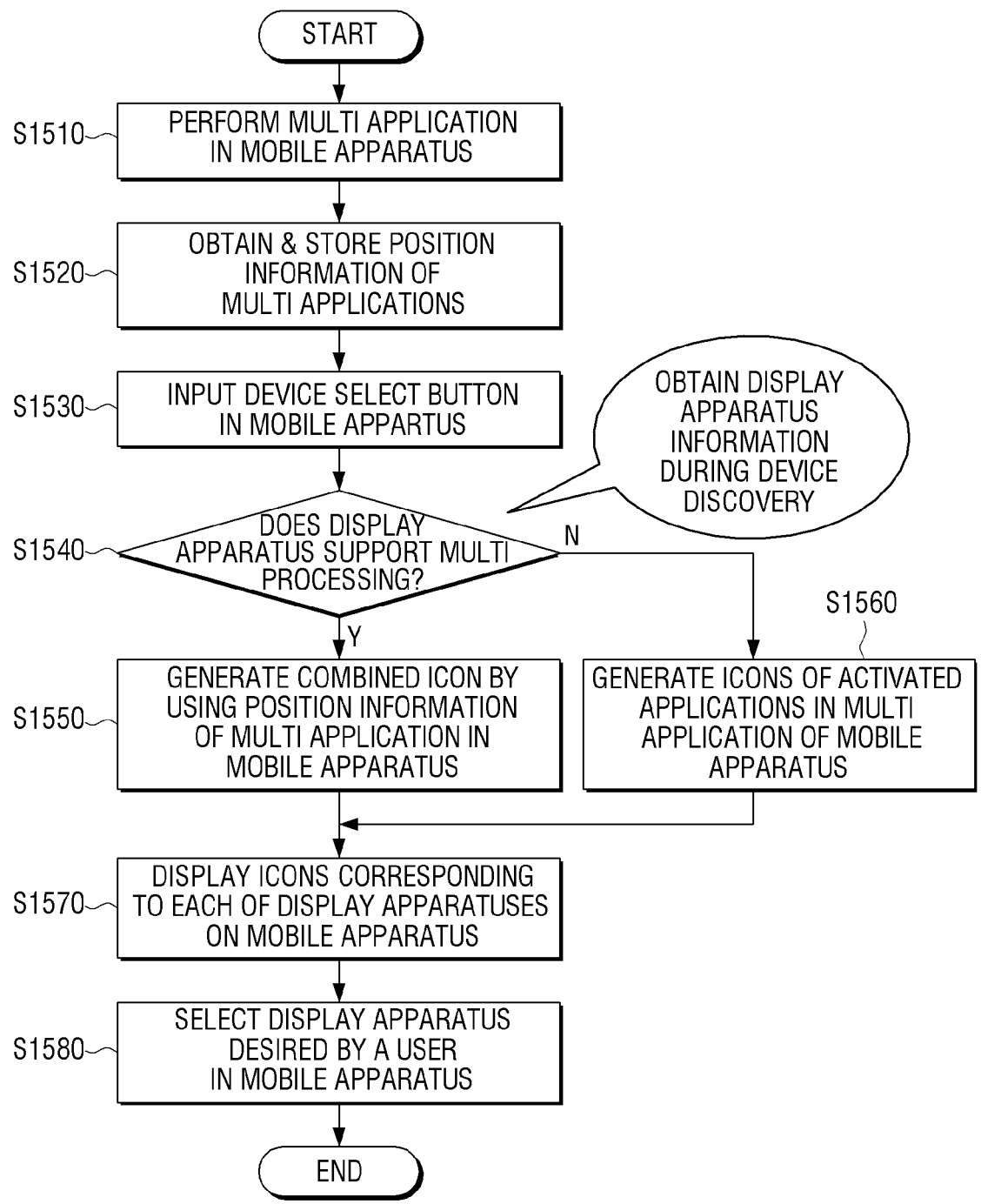
FIG. 15 is a flowchart provided to explain in further detail an operation of displaying supportability as shown in FIG. 14 in accordance with an exemplary embodiment.

FIG. 15 is a flowchart provided to explain in detail an operation of displaying an indication that indicate supportability similar to S1420 as illustrated in the method of FIG. 14 in accordance with one or more exemplary embodiments.

First, the mobile apparatus 100 performs multi-application execution at S1510.

When multi-application execution is performed, position information of multi-convergence applications is stored in the memory at S1520.

When a user inputs a button to request synchronization at S1530, communicatively connectable display apparatuses are discovered. Specifically, application installation information and information of supportability of multi-processing may be obtained from the communicatively connectable display apparatuses.

At S1540, it is determined whether or not the discovered display apparatus supports multi-processing. Specifically, based on the obtained information, it may be determined whether or not the discovered display apparatus supports multi-processing.

As a determined result, when the discovered display apparatus supports multi-processing at S1540-Y, combined icons may be generated, which indicate whether to respectively support driving applications or not, by using position information of the multi-application execution in the mobile apparatus 100 at S1550.

Further, when the discovered display apparatus does not support multi-processing at S1540-N, an icon may be generated, which indicates one application among the currently-driving multi-applications, that is supported by a corresponding display apparatus, at S1560.

At S1570, icons generated on the previous steps are displayed along with the discovered display apparatuses.

At S1580, the display apparatus that can perform synchronization is selected by a user through the displayed screen.

When the display apparatus is selected, synchronization can be performed by using following APIs.

First API: API to obtain information of applications which are installed, implemented, and completed in the current display apparatus
 HTTP method and URI
 GET /ws/app/{appID}/info
 Syntax: Request type: GET
 URI: /ws/app/{appID}/info
 Return value: 200 OK
 404 NOT FOUND
 BODY: widget information presented as JSON
 {"widgetInfo": {"ID":"multiWidget", "Version":"0.930", "Status":"RUNNING","widgetname":"multiWidget"}}

Second API: API to connect applications which are implemented in the display apparatus
 HTTP method and URI
 POST ws/app/{appID}/connect
 Syntax: Request type: POST
 URI: /ws/app/{appID}/connect
 Return value: 200 OK
 403 FORBIDDEN
 404 NOT FOUND Third API: API to shield connection with applications which are implemented in the display apparatus
 HTTP method and URI
 POST /ws/app/{appID}/disconnect
 Syntax: Request type: POST
 URI: /ws/app/{appID}/disconnect
 Return value: 200 OK
 403 FORBIDDEN
 404 NOT FOUND Fourth API: API to transmit information from the display apparatus to the mobile apparatus
HTTP method and URI
POST /ws/app/{appID}/display/send
Syntax: Request type: POST
URI: /ws/app/{appID}/display/send
Fifth API: API to transmit information from the mobile apparatus to the display apparatus
HTTP method and URI
POST /ws/app/{appID}/mobile/send
Syntax: Request type: POST
URI: /ws/app/{appID}/mobile/send FIG. 16 is a flowchart provided to explain a method for displaying a UI in the display apparatus according to an exemplary embodiment.

Figure 16:
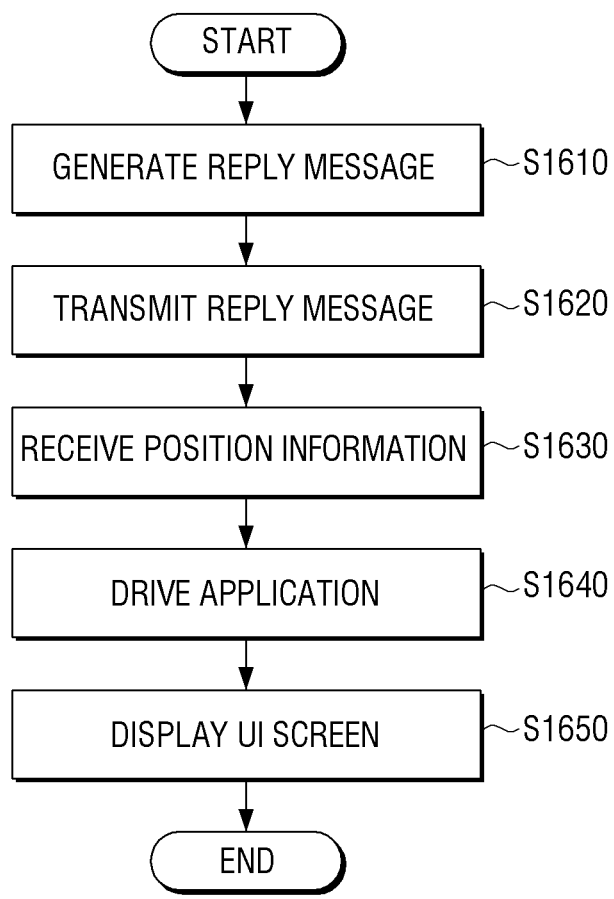
FIG. 16 is a flowchart provided to explain an operation of a display apparatus in accordance with an exemplary embodiment.

Referring to FIG. 16, a reply message is generated in response to a request at S1610, when the request for application information is received from the mobile apparatus 100 in accordance with one or more exemplary embodiments. Specifically, when information regarding the applications is requested from the mobile apparatus, a reply message is generated, regarding information about the display applications which are installed in the display apparatus 200 and availability of multi-processing.

At S1620, the generated reply message is transmitted to the mobile apparatus.

When a synchronizing command and position information are received from the mobile apparatus at S1630, the display applications corresponding to the synchronizing command are driven, at S1640.

At S1650, the user interface windows corresponding to the driving display applications are displayed according to the received position information.

Figure 17:
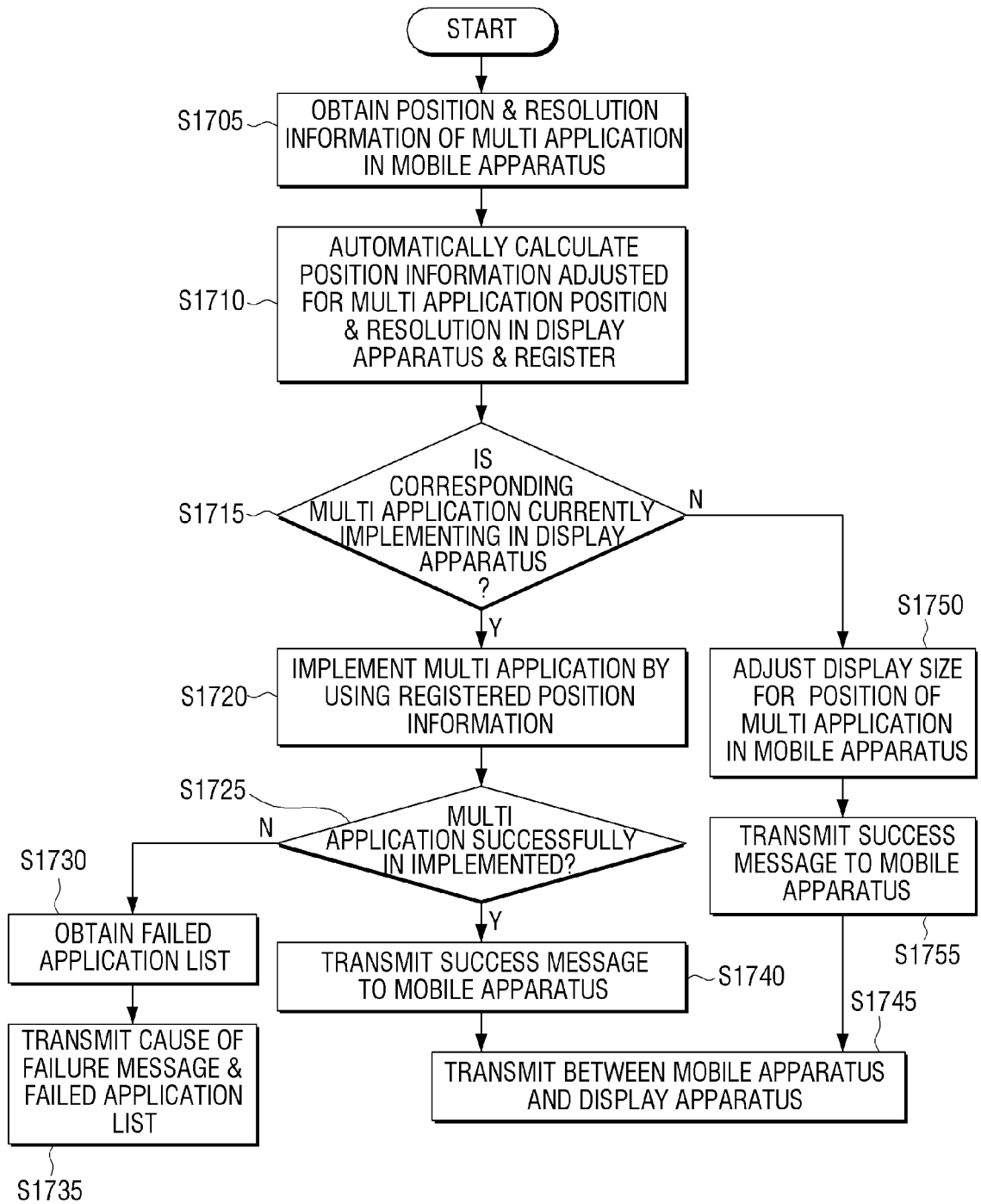
FIG. 17 is a flowchart provided to explain specific operation of a display apparatus in accordance with an exemplary embodiment.

FIG. 17 is a flowchart provided to explain specific operation of the display apparatus according to one or more exemplary embodiments.

At S1705, position of the multi convergence applications and resolution information are received from the mobile apparatus.

Further, proper position information to be displayed on the display apparatus is automatically calculated, by using the received position of the multi convergence applications and the resolution information, and registered in the memory, at S1710.

At S1715, it is determined whether the corresponding multi convergence applications are currently implemented in the display apparatus or not.

As a result of determining, display position is adjusted according to the position of the multi applications in the mobile apparatus at S1720, when the applications are already implemented.

It is determined whether the requested multi convergence applications are implemented successfully at S1725, and informed to the mobile apparatus that implementation is successful and that synchronization is completed, at S1730.

If implementation of every multi convergence application is not successful at S1725-N, a list of unimplemented applications is generated at S1730 and transmitted to the mobile apparatus at S1735.

If implementation is not yet performed, multi convergence applications are implemented by using the position information currently registered in the display apparatus, at S1750, and the implementing results are transmitted to the mobile apparatus, at S1755.

However, if implementation of every multi convergence application is successful, screen moves to an implementing screen of the multi convergence applications, at S1745. Thus, data transmission between the mobile apparatus and the display apparatus can be performed.

The UI display method in the display apparatus, according to an exemplary embodiment, may perform UI synchronization in response to the synchronizing command of the mobile apparatus 100. Further, even if the mobile apparatus 100 drives the plurality of applications, it can perform synchronization with the plurality of applications. The UI display method of FIG. 16 or FIG. 17 can be implemented in the display apparatus including the composition of FIG. 3 or other display apparatuses including different compositions.

Further, the above UI display method can be implemented with a program (or an application) which includes algorithms that can run in a computer, and the program can be stored and provided in non-transitory computer readable medium.

Figure 18:
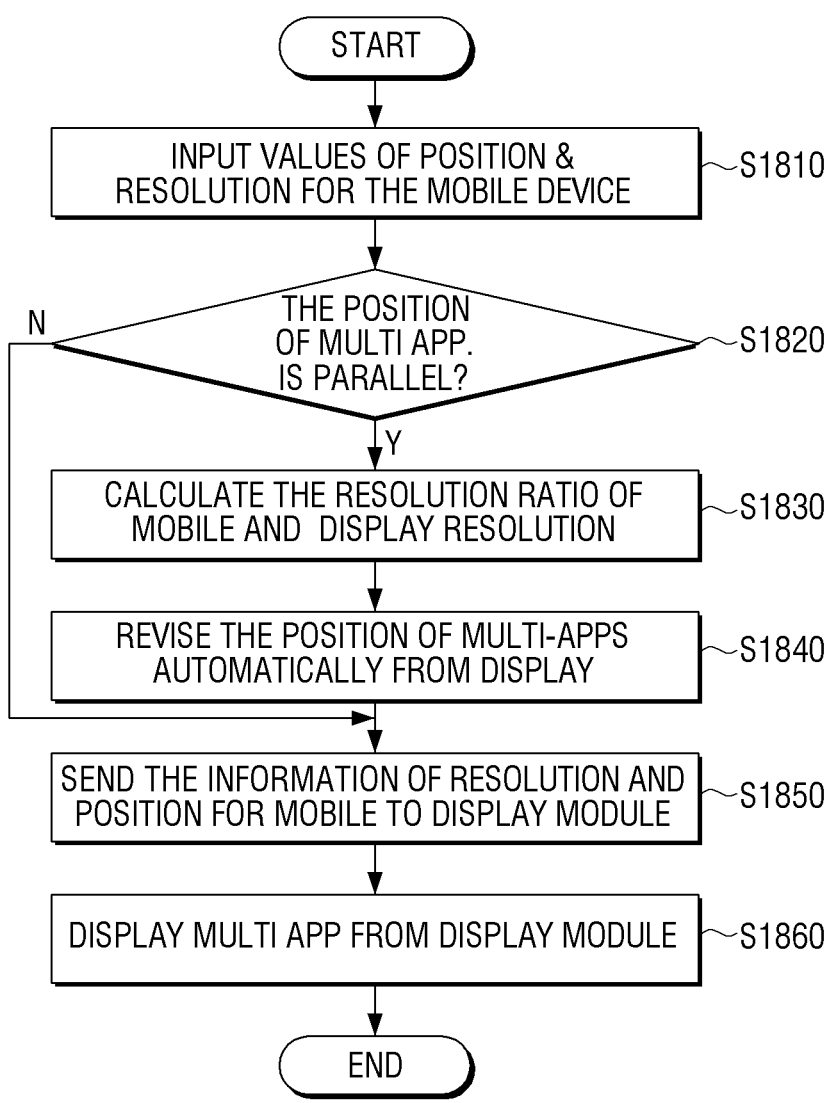
FIG. 18 is a flowchart provided to explain in further detail an operation as shown at S1710 of FIG. 17 in accordance with an exemplary embodiment.

FIG. 18 is a flowchart provided to explain in detail the operation at S1710 of FIG. 17.

First, position of the multi convergence applications and resolution information are received from the mobile apparatus, at S1810.

If position information indicates vertical arrangement only at S1820-Y, position is calculated by calculating ratio with the resolution of the display apparatus so that the multi convergence applications are arranged on a horizontal direction of the display apparatus, and the calculated values are registered in the memory, at S1830, S1840.

Further, the registered position values are delivered to display module so that the display apparatus can arrange the multi applications to be placed horizontally at S1850, S1860.

The foregoing exemplary embodiments and advantages are merely exemplary and are not to be construed as being limiting. The exemplary embodiments can be readily applied to other types of apparatuses. Also, the description of the exemplary embodiments are intended to be illustrative, and not to limit the scope of the claims.

What is claimed is:

1. A first display apparatus communicatively connectable to a second display apparatus, the first display apparatus comprising:
   a display; and
   a controller configured to:
      control the display to display a plurality of windows respectively corresponding to a plurality of applications running on the first display apparatus,
      in response to receiving a search command while the plurality of applications are running, discover a plurality of second display apparatuses communicatively connectable to the first display apparatus,
      collect from the second display apparatuses information regarding applications installed in each of the second display apparatuses,
      determine supportability of the plurality of applications in each of the second display apparatuses based on the information, and display a list of the second display apparatuses and indications respectively corresponding to the second display apparatuses, based on a result of the determining,
wherein each of the indications indicates whether each of the plurality of applications is supportable and displayable by each of the second display apparatuses.

2. The first display apparatus of claim 1, wherein the display is further configured to display a first area that displays information relating to the second display apparatus and a second area that displays information relating to the plurality of applications.

3. The first display apparatus of claim 2,
wherein the second area is further configured to display the indications as icons indicating supportability by the second display apparatus of the plurality of applications implemented in the first display apparatus in response to the second display apparatus indicating supportability of the plurality of applications, and
wherein the second area is further configured to display the indications as an icon regarding supportability of at least one application among the plurality of applications, when the second display apparatus can only support driving a subset of the plurality of applications.

4. The first display apparatus of claim 3, wherein the second area displays icons only for applications from the plurality of applications that are supported by the second display apparatus and which are being driven in the first display apparatus.

5. The first display apparatus of claim 3, wherein the second area is configured to arrange and display a plurality of icons in an arrangement similar to a format in which the applications will be displayed on the second display apparatus when performing synchronization with the second display apparatus.

6. The first display apparatus of claim 3,
wherein the display is further configured to receive a marking position selected for the second display apparatus regarding the plurality of applications, and
wherein the second area is further configured to arrange and display a plurality of icons so as to correspond to the selected marking position.

7. The first display apparatus of claim 1, wherein the request is inputted by at least one of a touching of a preset area of the display, a gesture image detected by an image sensor, a pushing of a mechanical button integrated in a chassis of the first display apparatus, a spatial movement detected by a piezoelectric sensor.

8. The first display apparatus of claim 1,
wherein the controller is further configured to collect application information from the second display apparatus on applications installed on the second display apparatus, in response to the request being received,
determine whether the second display apparatus supports the plurality of applications based on the collected application information, and control the play to display the determined results.

9. The first display apparatus of claim 1, wherein the controller is further
configured to collect information regarding supportability of the plurality of applications by the second display apparatus, in response to the request being received, and
control the display to display the collected information regarding supportability.

10. The first display apparatus of claim 1, wherein the controller is further configured to calculate marking position of applications in the second display apparatus respectively corresponding to the plurality of applications in the first display apparatus in response to a synchronizing command being received at the first display apparatus in response to a synchronizing command being received at the second display apparatus, and
transmit marking position information regarding each of the plurality of applications to the second display apparatus.

11. The first display apparatus of claim 10, wherein the controller is further configured to calculate marking position information of applications in the second display apparatus in proportion to sizes of a plurality of windows respectively corresponding to the plurality of applications.

12. The first display apparatus of claim 10, wherein, when the first display apparatus is further configured to operate in a vertical display mode, the controller calculates marking position information for applications in the second display apparatus so as to correspond to position similar to a plurality of windows of the first display apparatus while also rotating the marking position information such that the second display apparatus operates in a corresponding horizontal display mode.

13. The first display apparatus of claim 10, wherein, when a plurality of windows are configured to be displayed vertically in a line, the controller calculates marking position information so as to arrange applications of the second display apparatus corresponding to the plurality of applications horizontally in a line.

14. The first display apparatus of claim 10, wherein the controller is further configured to calculate the marking position information by adjusting and scaling in accordance with resolution of the applications in the second display apparatus.

15. The first display apparatus of claim 10, wherein the controller is further configured to transmit information on the plurality of applications and position information of the plurality of applications to the second display apparatus.

16. The first display apparatus of claim 15, wherein the controller is further configured to transmit an install address at which a non-supportable application is installed in response to at least one of the plurality of applications not being installed in the second display apparatus.

17. The first display apparatus of claim 15, wherein the position information comprises resolution information regarding each of the plurality of applications.

18. The first display apparatus of claim 1, wherein the controller is further configured to display a bundle of windows that respectively correspond to the plurality of applications, when a performing command is received.

19. A user interface (UI) display method of a first display apparatus communicatively connectable to a second display apparatus, the UI display method comprising:
displaying, on a display of the first display apparatus, a plurality of windows respectively corresponding to a plurality of applications that are running on the first display apparatus;
discovering a plurality of second display apparatuses communicatively connectable to the first display apparatus in response to receiving a search command while the plurality of applications are running,
collecting information regarding applications installed in each of the second display apparatuses,
determining supportability of the plurality of applications in each of the second display apparatuses based on the information, and displaying a list of the second display apparatuses and indications respectively corresponding to the second display apparatuses, based on a result of the determining, wherein each of the indications indicates whether each of the plurality of applications is supportable and displayable by each of the second display apparatuses.

20. The UI display method of claim 19, wherein the displaying the indication further comprises:

displaying on the display a first area that displays information relating to the second display apparatus and a second area that displays information relating to the plurality of applications.

21. The UI display method of claim 19, further comprising:

collecting application information from the second display apparatus on applications which are installed on the second display apparatus in response to the request for synchronizing being received; and determining whether the plurality of applications are supported in the second display apparatus based on the collected application information.

22. A non-transitory computer readable recording medium comprising a program which implements a UI display method, wherein the UI display method comprises:

displaying, on a display of a first display apparatus, a plurality of windows respectively corresponding to a plurality of applications that are running on the first display apparatus;

discovering a plurality of second display apparatuses communicatively connectable to the first display apparatus in response to receiving a search command while the plurality of applications are running, collecting information regarding applications installed in each of the second display apparatuses, determining supportability of the plurality of applications in each of the second display apparatuses based on the information, and displaying a list of the second display apparatuses and indications respectively corresponding to the second display apparatuses, based on a result of the determining, wherein each of the indications indicates whether each of the plurality of applications is supportable and displayable by each of the second display apparatuses.

* * * * *